United States Patent [19]

McDonald et al.

[11] 4,072,563
[45] Feb. 7, 1978

[54] INDUSTRIAL TECHNIQUE FOR AN INTEGRAL COMPACT REACTOR

[75] Inventors: Bertrand N. McDonald; Donald C. Schluderberg, both of Lynchburg, Va.

[73] Assignee: The Babcock & Wilcox Company, New York, N.Y.

[21] Appl. No.: 699,736

[22] Filed: June 24, 1976

[51] Int. Cl.² .............................................. G21C 19/28
[52] U.S. Cl. ......................................... 176/65; 176/60
[58] Field of Search ......................... 176/60, 65, 87; 165/107, 158

[56] References Cited

U.S. PATENT DOCUMENTS

| 3,325,374 | 6/1967 | Margen | 176/65 X |
| 3,385,760 | 5/1968 | Hawkins | 176/65 |
| 3,394,051 | 7/1968 | Purdy | 176/65 X |
| 3,395,076 | 7/1968 | Ruppen, Jr. | 168/158 X |
| 3,397,114 | 8/1968 | Deighton | 176/65 X |
| 3,442,760 | 5/1969 | Rigg | 176/65 X |
| 3,821,079 | 6/1974 | Jabsen | 176/65 X |

FOREIGN PATENT DOCUMENTS 1,472,118  12/1965  France .................... 176/65

Primary Examiner—Peter A. Nelson
Attorney, Agent, or Firm—Joseph M. Maguire; John P. Sinnott; Angelo Notaro

[57] ABSTRACT

A typical embodiment of an integral pressurized water nuclear reactor and straight-tube steam generator combination in accordance with the invention includes a generally cylindrical pressure vessel that is assembled from three segments which are bolted together at transverse joints to form a fluid and pressure tight unit that encloses the steam generator and the reactor. This novel construction permits primary to secondary coolant heat exchange and improved control rod drive mechanisms which can be exposed for full service access during reactor core refueling, maintenance and inspection.

5 Claims, 2 Drawing Figures

INDUSTRIAL TECHNIQUE FOR AN INTEGRAL COMPACT REACTOR

BACKGROUND OF THE INVENTION

1. FIELD OF THE INVENTION

This invention relates to nuclear reactor systems and, more particularly to pressurized water nuclear power reactor systems in which the heat exchanger is attached to a pressure vessel containing the core and which can be selectively disassembled.

2. DESCRIPTION OF THE PRIOR ART

Proposals have been advanced through the years to attached a pressure vessel containing a nuclear reactor core and associated pressurized water to a secondary coolant heat exchanger section to form a system capable of supplying heat energy for power generation or other purposes. A number of significant benefits are attainable through this structural configuration, especially if it is applied to shipboard and to land based electric power process energy uses.

One particular prior art reactor system of this nature has a heat exchanger in which the tubes are bent through 180° to produce a "U" shape. This specific heat exchanger design requires the ends of the bent tubes to be secured in a tube sheet that is extremely thick, unwieldy and difficult to manufacture.

This "U" tube heat exchanger, moreover, is positioned directly above the reactor core. In these circumstances, this configuration of heat exchanger tends to require unorthodox control rod drive systems and undesirable coolant circulating pump arrangements.

In this respect, the operation of the nuclear reactor is regulated by means of control rods which are inserted into and withdrawn from the reactor core in response to power demands. Control rod drive motors, mounted on the exterior surface of the cylindrical portion of the pressure vessel transmit power through a 90° angle to drive these control rods in desired directions relative to the reactor core. Not only is this a mechanically awkward arrangement, but it also increases the vulnerability of the control rod drive mechanism to potential malfunctions.

The coolant circulating pumps are mounted externally on "stalks" which are difficult to manufacture. Furthermore, these stalks, which consist of concentric piping of relatively large diameter, tend to compromise the intrinsic safety of an integrally arranged pressurized water reactor system due to the possibility (though remote) of their failure.

Clearly, there is a need for an integral reactor and heat exchanger system that reduces the thickness of the tube sheet and makes the reactor core more readily accessible for inspection and refueling, in addition to providing a less complicated, and hence more reliable control rod drive mechanism.

The above complications also tend to limit the thermal power range of this system to levels below 100 megawatts. By contrast, it is the intent of this invention to provide an integral pressurized water reactor system capable of power levels to at least 1500 thermal megawatts.

SUMMARY OF THE INVENTION

These and other problems that have characterized the prior art are overcome, to a great extent, through the practice of the invention. Illustratively a generally cylindrical pressure vessel is provided not only with a transverse separation in a plane between the reactor core and the heat exchanger, but also with a selectively detachable closure that supports the control rod drive mechanism.

More particularly, control rod drive motors and guide tubes are mounted on one of the arcuate pressure vessel closures. This closure is bolted to an adjacent transverse flange on the generally cylindrical portion of the steam generator section. The control rod guide tubes pass straight through the main body of this assembly and can be removed from the system with relative ease as a single closure unit. Because these tubes pass straight through the main body of this assembly, the need to transmit control rod drive power through a 90° angle that has characterized the prior art is eliminated, along with the attendant possibilities for mechanical difficulty.

Closure removal also exposes a portion of the heat exchanger to facilitate inspection and maintenance. The heat exchanger, moreover, can be entirely removed from the core containing pressure vessel structure through disconnecting the cylindrical portion that composes the heat exchanger section from the portion which encloses the reactor core at the transverse pressure vessel separation between the reactor core and the heat exchanger. In this circumstance, the reactor system is disassembled with relative ease into three essentially manageable segments that expose the control rods, heat exchanger and reactor core for inspection.

This triple segmented system, moreover, increases the plant layout flexibility, enabling the circulating pumps for the pressurized water to be positioned in the system for maximum efficiency and safety. This increased plant layout flexibility also manifests itself in a lower primary water inventory, greater freedom in the arrangement of the heat exchanger with respect to the pressure vessel, and significant reductions in construction costs and time.

More specifically, one illustrative embodiment of the invention disposes the heat exchanger in a hollow cylindrical space between the inside surface of the adjacent segment of the pressure vessel and the vessel's longitudinal axis. This particular arrangement enables the secondary coolant in the heat exchanger to flow in countercurrent relationship with the pressurized water. In these circumstances, the primary coolant, or pressurized water recirculating pumps can be mounted on the pressure vessel closure that is adjacent to the reactor core.

Mounting the pressurized water recirculating pumps in this location provides a number of noteworthy improvements. Perhaps, most important, is the higher plant efficiency that can be anticipated with this system. This improvement is expected because the recirculating pumps are located at that position in which the pressurized water is at its lowest temperature in the entire cycle, thereby decreasing the possibility of destructive cavitation and permitting the system to use a higher pressurized water temperature at the reactor core discharge, and in this manner to increase over-all plant power output. This pump location, moreover, adds an increased safety factor in the event of an accident in which a great deal of the pressurized water drains out of the pressure vessel. In this respect, as long as fresh cooling water can enter the pressure vessel from any source, the pump location adjacent to and below the reactor core will assure that this fresh cooling water will be pumped into that core. During those times, moreover, in which the power reactor system must be shut down for refueling, this structural arrangement provides a further advantage in that the pumps and their connections need not be disconnected because the pumps are mounted on that pressure vessel closure which is not removed.

Because the tubes that are used in the heat exchanger, or steam generator, that characterizes this embodiment of the invention are straight, these individual tubes are of relatively short length in comparison with the "U" tube configurations that characterize the prior art. This feature permits considerably thinner tube sheets to be used in the apparatus under consideration, in contrast to prior art tube sheets that may be more than double that thickness.

In another embodiment of the invention, the heat exchanger fills the entire volume of the segment of the pressure vessel that is separably connected to the portion of the vessel which houses the reactor core. The control rod drive lines in this embodiment also pass straight through the heat exchanger structure to regulate the operation of the control rods within the reactor core, hollow shrouds arranged parallel to the heat exchanger tubes being provided to house these drive lines. In this embodiment, moreover, the pressurized water and the secondary coolant both flow in the same direction (i.e. "parallel flow") in one portion of the heat exchanger in order to permit the pressurized water pump to recirculate primary coolant water that is at a lower temperature, thereby permitting a higher peak primary coolant temperature to be attained and thus increasing the power generating capacity of the entire system.

The various features of novelty which characterize the invention are pointed out with particularity in the claims annexed to and forming a part of this specification. For a better understanding of the invention, its operating advantages and specific objects attained by its use, reference should be had to the accompanying drawing and descriptive matter in which there is illustrated and described a preferred embodiment of the invention.

DETAILED DESCRIPTION OF THE PREFERRED EMBODIMENTS

Figure 1:
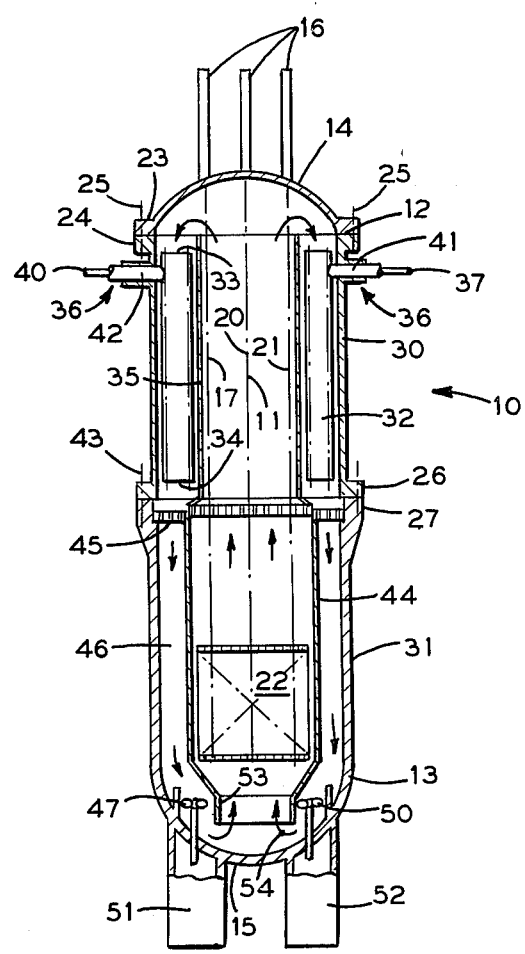
FIG. 1 is a front elevation in full section of a typical embodiment of the invention.

For a more complete appreciation of the invention, attention is invited to an illustrative embodiment that is shown in FIG. 1 of the accompanying drawing. More specifically, a hollow and generally cylindrical pressure vessel 10 has a longitudinal axis 11. Transverse ends 12, 13 of the pressure vessel are sealed by means of closures 14, 15, respectively. Typically, these closures are forged, or otherwise suitably formed, into shapes that are portions of the surface of a sphere.

The closure 14 supports schematically illustrated control rod drive apparatus 16. Drive lines 17, 20, 21 of the control rod apparatus 16 penetrate the closure 14 and pass through the pressure vessel 10 in a direction that is parallel to the longitudinal axis 11 in order to penetrate a reactor core 22 that is mounted in the pressure vessel 10 adjacent to but longitudinally spaced from the closure 15. The reactor core 22, moreover, has a longitudinal axis that is generally coincident with the longitudinal axis 11 of the pressure vessel 10. The closure 14, moreover, has an annular flange 23 that bears upon a matching flange 24 which forms the transverse end 12 of the pressure vessel 10. A circumferential array of studs or bolts 25 joins the closure 14 to the cylindrical body of the pressure vessel 10 to permit selective removal of the closure 14 and the attached control rod drive apparatus 16 as a single unit in accordance with one of the principal features of the invention. This separation, removal and replacement characteristic of the invention is exceptionally useful during those times in which the system is shut down for reactor core reloading and routine maintenance.

As shown in FIG. 1, the cylindrical portion of the pressure vessel 10 also is separably joined about a pair of mutually abutting flanges 26, 27 at a transverse midplane. The flanges 26, 27 generally divide the pressure vessel into two individual cylinders, a heat exchanger enclosure 30 and a reactor core support and enclosure 31.

The heat exchanger enclosure 30 forms a pressure vessel about an annular bundle of longitudinally disposed straight tubes 32. The ends of each of the tubes in the bundle are received in respective inwardly disposed tube sheets 33, 34 that are in the same planes as, and configuous with, the flanges 24 and 26, respectively. A longitudinally oriented hollow cylindrical shroud 35 forms a water and pressure tight enclosure for the tube bundle 32. This construction, moreover, is provided with concentric feedwater inlet and steam outlet pressure vessel penetrations 36 in which feedwater inlet tubes 37 and 40 are nested within respective enclosing steam discharge conduits 41, 42, thereby reducing thermal shocks and stresses to the enclosure 30 that otherwise might be caused by major temperature differences between the incoming feedwater and the operational temperature of the enclosure 30. However, exposure of the steam generator shell in this reactor system arrangement will also permit use of separate steam and feedwater connections. This is not true of some integral reactor arrangements where the steam generator is enclosed inside the primary coolant envelope.

As shown in FIG. 1, the open ends of the tubes in the bundle 32 that are secured in the tube sheets 33, 34 establish fluid communication through the heat exchanger for pressurized water that flows within the pressure vessel 10 as described subsequently in more complete detail. The secondary coolant, in contrast, is discharged into the portion of the heat exchanger that is defined by and the inner surfaces of the enclosure 30, the shroud 35 and the tube sheets 33, 34.

Bolts 43, or equivalent fasteners, join the opposing surfaces of the flanges 26, 27 together to permit the heat exchanger enclosure 30 to be selectively disengaged from the reactor core support and enclosure 31. This feature of the invention permits the heat exchanger and its enclosure 30 to be completely dismounted from the pressure vessel, exposing both of the tube sheets 33, 34 and the inner surface of the shroud 35 to visual inspection, as well as permitting each of the individual tubes in the tube bundle 32 to be inspected through ultrasonic techniques or other suitable methods without interfering with reactor core refueling operations. The relatively short, straight lengths of tube that comprise the bundle 32, moreover, are much less susceptible to stress-corrosion cracking and require less massive tube sheets than the longer lengths of bent tubes that have characterized prior heat exchangers.

The reactor core 22 is supported within a hollow, cylindrical core barrel 44. As shown in the drawing the reactor core 22 is lodged near one of the longitudinal ends of the barrel 44. The opposite end of the barrel 44, however, terminates in an outwardly disposed flange 45 that rests upon a mating groove that is formed on the inner periphery of the flange 27 of the reactor core enclosure 31. This construction supports the barrel and reactor core assembly. In order to promote pressurized water flow from the discharge end of the tubes that are received in the tube sheet 34 into an annular downcomer 46 that is formed between the inner wall of the reactor core support and enclosure 31 and the outer wall of the core barrel 44, longitudinally oriented perforations are formed in the core barrel flange 45. Thus, the core barrel 44 not only provides structural support for the reactor core 22, but it also provides a baffle that directs the pressurized water flow within the vessel 10 toward recirculating pump impellers 47, 50.

In accordance with a principal feature of this embodiment of the invention, the impellers 47, 50 are positioned inside the pressure vessel 10 adjacent to the transverse end closure 15. Motors 51, 52 for driving the impellers 47, 50 respectively, are mounted on the exterior surface of the closure 15 and are coupled to the associated impellers by means of individual shafts that penetrate the closure 15. The impellers 47, 50 discharge the pressurized water to enable the recirculating water to flow into a cavity that is formed by a longitudinally disposed skirt 53 that is positioned between the reactor core 22 and the interior surface of the closure 15.

In operation, pressurized water is discharged from pump impellers 47, 50 and flows, in the direction of arrows 54, parallel to the longitudinal axis 11 of the pressure vessel 10 through the reactor core 22. The water that flows through the reactor core 22 absorbs a great deal of heat from the effects of the fission processes that take place within the core. This heated and pressurized water then continues to flow in a direction that is parallel to the pressure vessel's longitudinal axis 11 through the central portion that is defined by the core barrel 44 and the heat exchanger shroud 35. On reaching the closure 14, the pressurized water flow is conducted through a 180° turn in order to flow through the tubes that form the tube bundle 32 in the annular heat exchanger. Within the heat exchanger, the pressurized water transfers its heat to a secondary coolant which rises into steam. The secondary coolant steam flows out of the heat exchanger through the discharge conduits 41, 42.

Having transferred heat to the secondary coolant, the temperature of primary coolant is decreased, and a colder primary coolant flows from the tube bundle 32, through the perforations in the core barrel flange 45 and through the annular downcomer 46 to the impellers 47, 50. It is important to note that the temperature of the pressurized water is at its lowest point, or at least close to its lowest point at the recirculating pump inlets. This feature of the invention leads to a number of advantages. The pumps circulating colder pressurized primary coolant water, which has a relatively lower threshold for cavitation which tends to destroy the impellers, permit higher primary water outlet temperatures, which, in turn, enhances steam generator performance. Positioning the pumps on the closure 15 also increases the reactor's safety margin, should the system lose much of the primary coolant through a leak, or the like. With the recirculating pump impellers 47, 50 located in the position shown in FIG. 1, however, cooling water can be pumped into the reactor core 22 from any source. During routine refueling operations power, instrument and cooling water connections for these pumps do not have to be disturbed, in contrast to the need to perform this additional work for pumps that are located at some other place in the pressurized water cycle.

Figure 2:
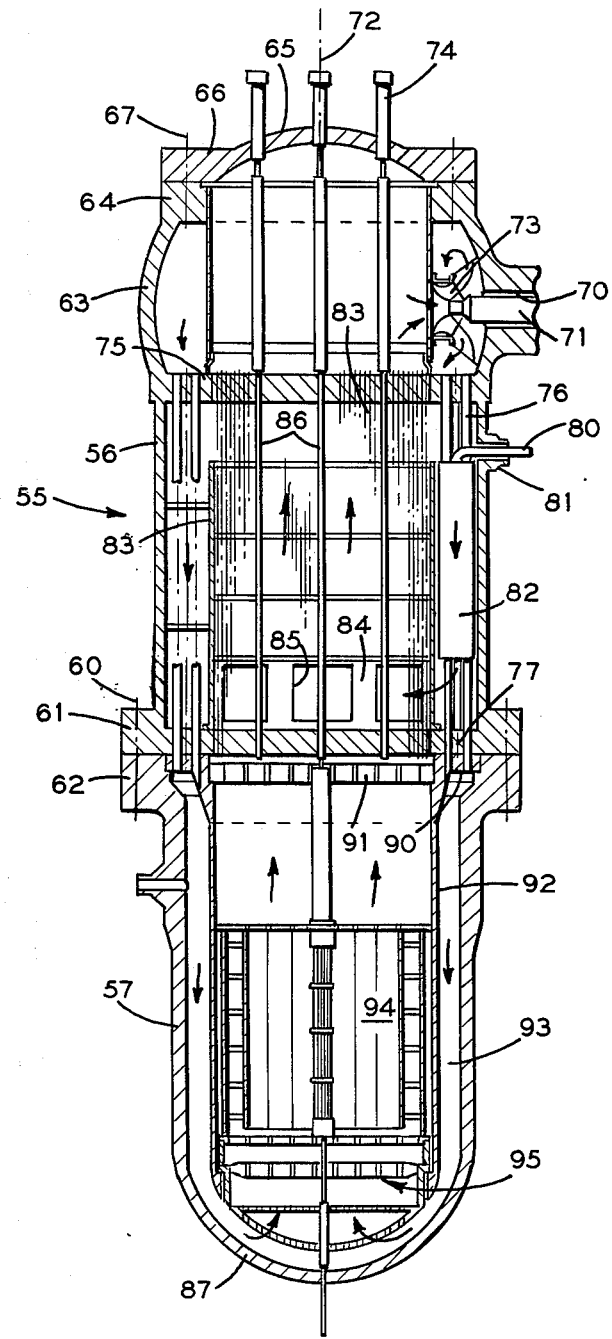
FIG. 2 is a front elevation in full section of another embodiment of the invention.

Attention now is invited to FIG. 2 of the drawing which shows a further embodiment of the invention. As illustrated, pressure vessel 55 has two generally hollow cylindrical enclosures, a heat exchanger enclosure 56 and a reactor core enclosure 57. The enclosures 56, 57 abut in a common transverse plane and are separably joined together by means of studs 60 that penetrate opposing transverse flanges 61, 62 which are formed on the exterior end surfaces of the enclosures 56, 57, respectively in the common plane.

The transverse end of the enclosure 56 that is opposite from the end with the flange 61 terminates in a bulbous portion 63. The portion 63 has a transverse flange 64 that circumscribes the circular opening in this end of the heat exchanger enclosure. An adjacent end closure 65 that is shaped in the form of a portion of a sphere also has a peripheral flange 66 that rests upon the bulbous portion flange 64. Bolts 67 in the flanges 64, 66 separably join the closure 65 to the heat exchanger enclosure 56.

As illustrated in connection with this embodiment of the invention, a penetration 70 in the bulbous portion 63 provides a journal for a pump shaft 71. The longitudinal axis of the shaft 71 is oriented in a direction that is generally perpendicular to longitudinal axis 72 of the pressure vessel 55. Within the bulbous portion 63, the pump shaft 71 terminates in an impeller 73 for recirculating the pressurized primary coolant water within the vessel 55 as described subsequently in more complete detail.

The end closure 65 also has guide tubes 74 for the reactor control rod drive lines.

Within the heat exchanger enclosure 56, and at the transverse plane of intersection between the cylindrical and bulbous portions there is a transversely disposed tube sheet 75 that accommodates two tube banks, each of different diameter tubing. As shown, there is an outer annular array of large diameter straight tubes 76 which establish fluid communication between the fluid discharge from the impeller 73 that is adjacent to the tube sheet 75 and the discharge side of a tube sheet 77 which is transversely positioned in the end of the enclosure 56 that is adjacent to the reactor core enclosure 57. The extreme longitudinal ends of the tubes in the bank that form the annular large diameter array 76 are, of course, anchored in mating apertures in the tube sheets 75, 77.

Secondary coolant is admitted to the heat exchanger through a feedwater inlet tube 80 that is nested within and concentric with steam discharge conduit 81. Within the bank of large diameter tubes 76 the feedwater inlet tube 80 is bent through a 90° angle in order to discharge the inwardly flowing secondary coolant liquid within a hollow cylindrical sleeve 82 that is open at both ends and that is nested within the array of large diameter tubes 76. The steam discharge conduit 81, in contrast, merely establishes fluid or vapor communication with the interior volume of the heat exchanger enclosure 56. Naturally, a number of sleeve and inlet tube combinations can be located at intervals in the annular tube array. Furthermore, a portion of inlet tube 80 can be designed to be replaceable by incorporation of a suitable joint in the vertical portion just below the 90° bend.

Smaller diameter straight tubes form a central bank of tubes 83 that are positioned in parallel alignment with the longitudinal axis 72 of the pressure vessel 55 between the tube sheets 75, 77. This centrally disposed bank of smaller diameter tubes 83 is enclosed by a hollow, cylindrical, and longitudinally positioned shroud 84. As illustrated, the shroud 84 has secondary coolant inlet ports 85 formed in the end of the shroud that is near to the tube sheet 77. Within the central tube bank 83 moreover, provision is made for control rod drive line guide tubes 86 which permit the control rod drive lines to pass straight through the central tube bank 83 as well as the tube sheets 75, 77.

The reactor core enclosure 57 has a hemispherical closure 87 that is joined to the open transverse end of the cylindrical portion of the closure which is opposite to the end that has the flange 62. Within the enclosure 57, a peripheral groove 90 is formed in the flange 62 in order to support an annular flange 91 on a hollow, cylindrical and longitudinally oriented core barrel 92. The longitudinal axis of the core barrel 92 is coincident with the longitudinal axis 72 of the pressure vessel 55. The transverse outer diameter of the core barrel 92, however, is less than the inner diameter of the reactor core enclosure 57. This difference in respective diameters provides an annular clearance between the core barrel 92 and the enclosure 57 that serves as a downcomer 93 which directs recirculating pressurized water from the annular array of larger tubes 76 toward the hemispherical closure 87.

As illustrated in FIG. 2, reactor core 94 is supported within the portion of the core barrel 92 that is adjacent to the hemispherical closure 87. Transversely disposed grid structures 95 are positioned under the reactor core 94 to bear the weight of the reactor core, to transfer this weight to the core barrel 92 and to balance the pressurized water flow distribution within the reactor core.

In operation, as hereinbefore mentioned, pressurized primary coolant water flows through the downcomer 93. The shape of the interior surface of the hemispherical closure 87 redirects the pressurized water, causing it to flow in the opposite direction and through the reactor core 94. Within the reactor core 94, the pressurized water absorbs heat and continues in its travel parallel to the longitudinal axis 72 through the central bank 83 of smaller diameter tubes. Heat is transferred from the pressurized water flowing within the smaller diameter tubes to the secondary coolant that immerses a portion of the tubes in this centrally disposed bank. This secondary coolant rises into steam and flows out of the pressure vessel through the steam discharge conduit 81.

Because the secondary coolant inlet ports 85 in the shroud 84 are positioned close to the tube sheet 77 that is adjacent to the reactor core 94, the secondary coolant enjoys a flow path that is essentially parallel with the flow of the pressurized water within the tubes in the bank 83. Upon passing through the tubes in the bank 83, the now colder pressurized water enters the bulbous portion 63 where the impeller 73 pumps this pressurized water from the bulbous portion through the larger diameter tubes 76 in the annular array for recirculation by way of the downcomer 93.

Illustratively, the smaller diameter tubes in the central bank 83 could have an outside diameter of ½ inch. The larger diameter tubes 76, on the other hand, might have an outside diameter of 3½ inches. The larger diameter tubes 76, permit the pressurized water to recirculate with a minimum pressure loss. If a larger number of smaller tubes are used to conduct the same volume of pressurized water with the same mass flow per tube from the impeller discharge the pressure drop in the flowing water would be quite significant, and tend to decrease the overall system efficiency. Special note should be made in this respect that the flow of the pressurized water within the larger diameter tubes 76 and the flow of the secondary coolant that is admitted through the feedwater inlet tube 80 are oriented in the same longitudinal directions or parallel flow. In this circumstance, however, some of the discharged feedwater in contact with the tubes 76 rises into steam and flows toward the discharge conduit 81 in a direction that is opposite to the direction on which the pressurized water is flowing in the tubes 76.

As mentioned above, service inspection, core refueling and the like is significantly easier. For example, the end closure 67 is unbolted and removed, withdrawing the control rod drive linkages from the pressure vessel as a single unit. The impeller 73 and associated shaft and pump motor, however, need not be disconnected while the heat exchanger is undergoing inspection. To refuel the reactor core, the heat exchanger enclosure 56 is disconnected from the reactor core enclosure 57 and removed as a unit with the aid of a suitable tackle in order to expose the reactor core 94 for refueling, inspection and the like. Thus, in accordance with the principles of the invention, shipment of the pressure vessel in smaller, more manageable sections for on-site assembly is eased and simplified, as well as a number of other significant operational problems.

The embodiments of the invention in which an exclusive property or privilege is claimed are defined as follows:

1. An integral nuclear power reactor system comprising a reactor core section that has a longitudinal axis, a heat exchanger section spaced longitudinally from said reactor core section, control rod drive lines passing in a longitudinal direction through said heat exchanger section and into said reactor core section, a pressure vessel having a longitudinal axis that is generally coincident with said reactor core axis, said pressure vessel enclosing said reactor core and attached to said heat exchanger section, an end closure to said heat exchanger section, said reactor core section defining with the inner wall of said pressure vessel an annulus, the integral nuclear reactor system being selectively separable at two longitudinally spaced transverse planes, one of said planes located between said pressure vessel and said heat exchanger section and the other of said transverse planes located between said heat exchanger section and said end closure said end closure having guide tubes attached thereto in order to accommodate said control rod drive lines, and a bundle of generally straight tubes disposed in an annular array within said heat exchanger section establishing fluid communication between said annulus and said end closure.

2. An integral nuclear power reactor system comprising a reactor core section that has a longitudinal axis, a generally cylindrical heat exchanger section spaced longitudinally from said reactor core section, said heat exchanger section terminating in a bulbous portion at one end, an end closure spaced longitudinally at said bulbous end of said heat exchanger section, control rod drive lines passing in a longitudinal direction through said heat exchanger section and into said reactor core section, a pressure vessel having a longitudinal axis that is generally coincident with said reactor core axis, said pressure vessel enclosing said reactor core and attached to said heat exchanger section, said end closure having guide tubes extending longitudinally therethrough in order to accommodate said control rod drive lines, the integral nuclear reactor system being selectively separable at two longitudinally spaced planes, one of said planes located between said pressure vessel and said heat exchanger section and the other of said transverse planes located between said heat exchanger section and said end closure.

3. A system according to claim 2 wherein said heat exchanger section further comprises a first tube sheet and a second tube sheet, said first and second tube sheets having pluralities of tube receiving openings, said first and second tube sheets being disposed transversely to said longitudinal axis and longitudinally spaced with respect to each other, a longitudinal cylindrical shroud radially spaced within said heat exchanger section partly between said tube sheets and defining with the inner wall of said heat exchanger section an annular flow space, a plurality of smaller diameter straight tubes longitudinally disposed within said shroud, a plurality of larger diameter straight tubes longitudinally disposed within said annular flow space, at least one hollow cylindrical sleeve nested between said plurality of said larger diameter tubes within said annular flow space, said smaller and larger diameter tubes being attached in a fluid tight manner to the tube receiving openings in said tube sheets to establish a primary fluid communication between said reactor core section and said bulbous portion of said heat exchanger section, and said shroud having at least one port of establishing a secondary fluid communication between said sleeve and the volume between said shroud and the exterior of said smaller diameter tubes.

4. A system according to claim 3 further comprising at least one primary fluid circulating pump means within said bulbous portion of said heat exchanger section for circulating primary fluid from said bulbous portion through said larger diameter tubes, said reactor core, and said smaller diameter tubes.

5. A system according to claim 1 further comprising at least one reactor coolant circulating pump impeller within said pressure vessel to establish fluid flow between said annular heat exchanger, said annulus, and said reactor core, said impeller being spaced longitudinally from said heat exchanger and adjacent to said reactor core.

* * * * *